(12) United States Patent
Isowaki et al.

(10) Patent No.: US 7,993,536 B2
(45) Date of Patent: Aug. 9, 2011

(54) METHOD OF MANUFACTURING MAGNETIC RECORDING MEDIUM

(75) Inventors: Yousuke Isowaki, Yokohama (JP);
Kaori Kimura, Kawasaki (JP);
Yoshiyuki Kamata, Tokyo (JP);
Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/636,610

(22) Filed: Dec. 11, 2009

(65) Prior Publication Data

US 2010/0147791 A1    Jun. 17, 2010

(30) Foreign Application Priority Data

Dec. 12, 2008    (JP) .................................. 2008-317382

(51) Int. Cl.
*B44C 1/22*    (2006.01)

(52) U.S. Cl. .............. 216/22; 216/41; 216/67; 438/717; 438/754

(58) Field of Classification Search ................... 216/22, 216/40, 51, 67, 75; 438/736, 754, 706, 717, 438/720
See application file for complete search history.

(56) References Cited

U.S. PATENT DOCUMENTS

| | | | |
|---|---|---|---|
| 6,221,519 B1 | 4/2001 | Doi et al. | |
| 6,266,354 B1 | 7/2001 | Chino et al. | |
| 6,984,529 B2 * | 1/2006 | Stojakovic et al. | ............... 438/3 |
| 7,067,207 B2 | 6/2006 | Kamata et al. | |
| 2004/0253817 A1 | 12/2004 | Imada et al. | |
| 2005/0243467 A1 | 11/2005 | Takai et al. | |
| 2005/0284842 A1 | 12/2005 | Okawa et al. | |
| 2006/0003551 A1 * | 1/2006 | Mancini et al. | ............... 438/462 |
| 2006/0021966 A1 | 2/2006 | Hattori et al. | |
| 2006/0124585 A1 | 6/2006 | Suwa et al. | |
| 2006/0222897 A1 | 10/2006 | Kamata et al. | |
| 2006/0222899 A1 | 10/2006 | Sugimura et al. | |
| 2007/0070547 A1 | 3/2007 | Kamata et al. | |
| 2007/0211592 A1 * | 9/2007 | Sakurai et al. | ............. 369/47.49 |
| 2007/0224339 A1 | 9/2007 | Kamata et al. | |
| 2007/0263324 A1 | 11/2007 | Allen et al. | |
| 2007/0281078 A1 | 12/2007 | Kikitsu et al. | |
| 2008/0075845 A1 | 3/2008 | Sonobe et al. | |
| 2008/0078739 A1 | 4/2008 | Hibi et al. | |

(Continued)

FOREIGN PATENT DOCUMENTS

JP    02-207418    8/1990

(Continued)

OTHER PUBLICATIONS

Explanation of Non-English Language References.

(Continued)

*Primary Examiner* — Lan Vinh
(74) *Attorney, Agent, or Firm* — Knobbe, Martens, Olson & Bear, LLP (57) ABSTRACT

According to one embodiment, a method of manufacturing a magnetic recording medium includes forming a first hard mask, a second hard mask and a resist film on a magnetic recording layer, imprinting a stamper on the resist film to transfer patterns of recesses and protrusions, removing residues remained in recess of the patterned resist film, etching the second hard mask using the patterned resist film as a mask to transfer patterns of recesses and protrusions, etching the first hard mask using the patterned second hard mask as a mask to transfer patterns of recesses and protrusions, and deactivating magnetism of the magnetic recording layer exposed in the recesses together with removing the second hard mask by ion-beam etching.

21 Claims, 3 Drawing Sheets

U.S. PATENT DOCUMENTS

| | | |
|---|---|---|
| 2008/0093336 A1 | 4/2008 | Lee et al. |
| 2008/0158718 A1 | 7/2008 | Kobayashi et al. |
| 2008/0174914 A1 | 7/2008 | Takai et al. |
| 2008/0217615 A1 | 9/2008 | Kerber |
| 2009/0023078 A1 | 1/2009 | Gutmann et al. |
| 2009/0305081 A1 | 12/2009 | Dai et al. |
| 2009/0308837 A1 | 12/2009 | Albrecht et al. |
| 2010/0018946 A1 | 1/2010 | Isowaki et al. |
| 2010/0018947 A1 | 1/2010 | Kimura et al. |
| 2010/0047625 A1 | 2/2010 | Kamata et al. |
| 2010/0053813 A1 | 3/2010 | Fukushima et al. |
| 2010/0059476 A1 | 3/2010 | Yamamoto et al. |
| 2010/0214694 A1 | 8/2010 | Kimura et al. |
| 2010/0214695 A1 | 8/2010 | Isowaki et al. |
| 2010/0215989 A1 | 8/2010 | Isowaki et al. |

FOREIGN PATENT DOCUMENTS

| | | |
|---|---|---|
| JP | 03-040219 | 2/1991 |
| JP | 05-205257 | 8/1993 |
| JP | 11-328652 | 11/1999 |
| JP | 2000-286241 | 10/2000 |
| JP | 2002-501300 | 1/2002 |
| JP | 2002-359138 | 12/2002 |
| JP | 2003-183859 | 7/2003 |
| JP | 2004-164692 | 6/2004 |
| JP | 2005-042143 | 2/2005 |
| JP | 2005-050468 | 2/2005 |
| JP | 2005-056535 | 3/2005 |
| JP | 2005-070650 | 3/2005 |
| JP | 2005-071542 | 3/2005 |
| JP | 2005-317155 | 11/2005 |
| JP | 2006-012332 | 1/2006 |
| JP | 2006-147148 | 6/2006 |
| JP | 2006-196143 | 7/2006 |
| JP | 2007-095115 | 4/2007 |
| JP | 2008-065944 | 3/2008 |
| JP | 2008-135092 | 6/2008 |
| JP | 2008-210450 | 9/2008 |
| JP | 2008-135092 | 12/2008 |
| JP | 2009-076924 | 4/2009 |
| JP | 2009-170007 | 7/2009 |
| JP | 2009-181674 | 8/2009 |
| JP | 2009-301655 | 12/2009 |
| JP | 2010-033636 | 2/2010 |

OTHER PUBLICATIONS

Notice of Reasons for Rejection mailed by Japan Patent Office on Oct. 13, 2009 in Japanese Patent Application No. 2008-192537 (corresponding to U.S. Appl. No. 12/508,269).

Notice of Reasons for Rejection mailed by Japan Patent Office on Nov. 17, 2009 in Japanese patent application No. 2008-213674 (corresponding to U.S. Appl. No. 12/544,606).

Notice of Reasons for Rejection mailed by Japan Patent Office on Oct. 13, 2009 for Japanese Patent Application No. 2008-192536 (corresponding to U.S. Appl. No. 12/509,261).

Notice of Reasons for Rejection mailed by Japan Patent Office on Feb. 2, 2010 for Japanese Patent Application No. 2008-192536 (corresponding to U.S. Appl. No. 12/509,261).

Notice of Reasons for Rejection mailed by Japan Patent Office on Apr. 20, 2010 for Japanese Patent Application No. 2009-038207 (corresponding to U.S. Appl. No. 12/705,456).

Notice of Reasons for Rejection mailed by Japan Patent Office on Apr. 20, 2010 for Japanese Patent Application No. 2009-038206 (corresponding to U.S. Appl. No. 12/705,490).

Notice of Reasons for Rejection mailed by Japan Patent Office on Apr. 20, 2010 for Japanese Patent Application No. 2009-038208 (corresponding to U.S. Appl. No. 12/705,421).

Notice of Reasons for Rejection mailed by the Japan Patent Office on Mar. 9, 2010 in the corresponding Japanese patent application No. 2008-317382.

* cited by examiner

METHOD OF MANUFACTURING MAGNETIC RECORDING MEDIUM

CROSS-REFERENCE TO RELATED APPLICATIONS

This application is based upon and claims the benefit of priority from Japanese Patent Application No. 2008-317382, filed Dec. 12, 2008, the entire contents of which are incorporated herein by reference.

BACKGROUND

1. Field

One embodiment of the present invention relates to a method of manufacturing a magnetic recording medium such as a patterned medium.

2. Description of the Related Art

In recent years, in magnetic recording media installed in hard disk drives (HDDs), there is an increasing problem of disturbance of enhancement of track density due to interference between adjacent tracks. In particular, a serious technical subject is reduction of a fringe effect of a write head field.

To solve such a problem, a discrete track recording medium (DTR medium) has been proposed in which recording tracks are physically separated by processing a ferromagnetic layer. The DTR medium can reduce a side erase phenomenon, i.e., erasing information from an adjacent track in writing operation, and a side read phenomenon, i.e., reading out information from an adjacent track in reading operation, making it possible to enhance the track density. Therefore, the DTR medium is expected as a magnetic recording medium capable of providing a high recording density. Similarly, a bit patterned medium (BPM) having a dot-like magnetic pattern is also expected as a magnetic recording medium capable of providing high recording density.

A known method of manufacturing a patterned medium (DTR medium or BPM) comprises forming a hard mask film made of carbon and a resist film on the magnetic recording layer, imprinting a stamper to the resist film to transfer patterns of protrusions and recesses, etching the hard mask using the resist film pattern as a mask to transfer the patterns of protrusions and recesses on the hard mask, and etching the magnetic recording layer using the hard mask pattern as a mask to form patterns of protrusions and recesses on the magnetic recording layer.

Jpn. Pat. Appln. KOKAI Publication Nos. 2005-50468 and 2005-56535 disclose the technique in which etching of the magnetic recording layer and the removing of a hard mask are performed in a same step by using an Ar ion beam etching. However, when the disclosed Ar ion beam etching is used, sufficient effect for magnetically deactivate the magnetic recording layer exposed in the recesses cannot expected. As a result, it is required to etch the magnetic recording layer throughout the thickness thereof for making the recesses of the pattern non-magnetic. In this case, however, considering flying characteristics of the magnetic head when the magnetic recording media is installed in a hard disc drive, a step of filling in the recesses with non-magnetic material is required to attain planarization, resulting in severe decrease of productivity.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a method of manufacturing a magnetic recording medium comprising: forming a first hard mask, a second hard mask and a resist film on a magnetic recording layer; imprinting a stamper on the resist film to transfer patterns of recesses and protrusions; removing residues remained in recess of the patterned resist film; etching the second hard mask using the patterned resist film as a mask to transfer patterns of recesses and protrusions; etching the first hard mask using the patterned second hard mask as a mask to transfer patterns of recesses and protrusions; and deactivating magnetism of the magnetic recording layer exposed in the recesses together with removing the second hard mask by ion-beam etching.

Figure 1:
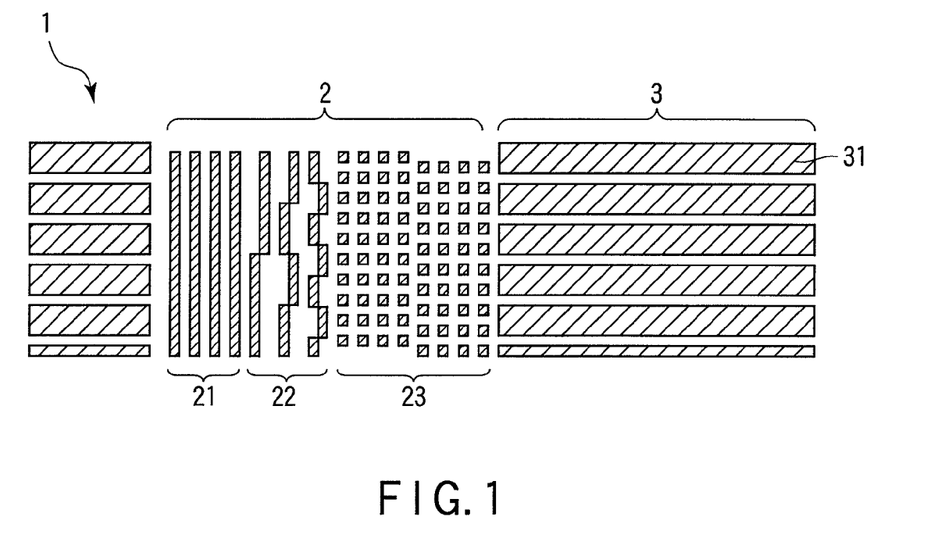
FIG. 1 is a plan view of a discrete track recording medium (DTR medium) along the circumferential direction, which is manufactured by using the method of the present invention.

FIG. 1 is a plan view of a discrete track recording (DTR) medium along the circumferential direction, which is an example of a patterned medium manufactured by using the method of the present invention. As shown in FIG. 1, servo regions 2 and data regions 3 are alternately formed in the circumferential direction of the patterned medium 1. The servo region 2 includes a preamble section 21, an address section 22 and a burst section 23. The data region 3 includes discrete tracks 31, which are separated from each other.

The patterned medium manufactured by using the method of the present invention is not limited to the DTR medium shown in FIG. 1, but includes a bit patterned medium (BPM) having dot-like magnetic patterns separated not only in the cross-track direction but also in the down-track direction.

An example of a method of manufacturing a magnetic recording medium according to the present invention will be described with reference to FIGS. 2A to 2H.

Figure 2A:
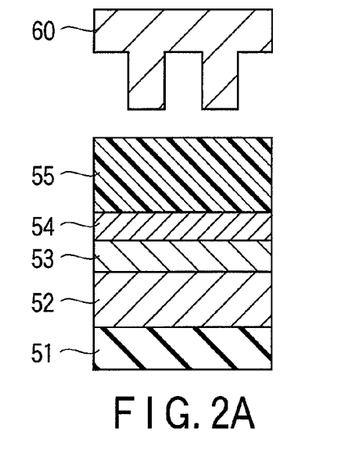
FIGS. 2A to 2H are cross-sectional views showing an example of a method of manufacturing a magnetic recording medium according to the present invention.

As shown in FIG. 2A, an underlayer (not shown) and a 20-nm-thick magnetic recording layer 52 are deposited on a glass substrate 51. A first hard mask 53 made of 15-nm-thick carbon and a second hard mask 54 made of 3-nm-thick Cu are deposited on the magnetic recording layer 52. A resist 55 is deposited on the second hard mask 54 by spin coating. On the other hand, a stamper 60 is prepared on which predetermined patterns of protrusions and recesses corresponding to the patterns of the DTR medium shown in, for example, FIG. 1 are formed. The stamper 60 is produced through steps such as EB lithography, Ni electroforming and injection molding. The stamper 60 is arranged such that the patterned surface of the stamper 60 faces the resist 55.

Figure 2B:
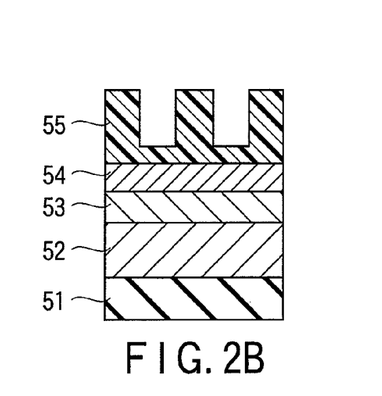

As shown in FIG. 2B, the patterns of protrusions and recesses of the stamper 60 are transferred to the resist 55 by imprinting the stamper 60 to the resist 55. Then, the stamper 60 is removed. Resist residues are left on the bottoms of the recesses of the patterns transferred to the resist 55.

Figure 2C:
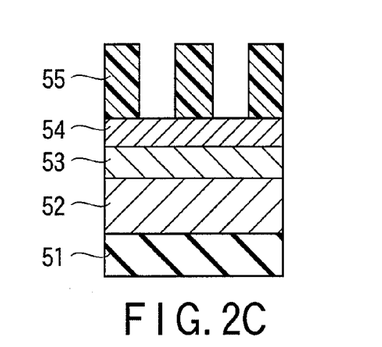

As shown in FIG. 2C, the resist residues in the recesses are removed by dry etching so as to expose the surface of the second hard mask 54. At this time, the resist residues are removed by employing, for example, an induction coupling plasma (ICP) RIE apparatus using oxygen as the etching gas.

Figure 2D:
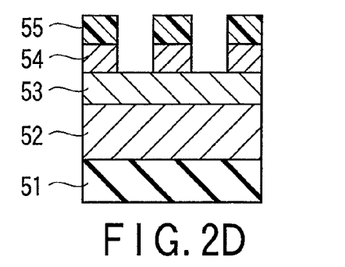

As shown in FIG. 2D, the patterns of the resist is transferred to the second hard mask 54 by performing ion-beam etching using the patterned resist 55 as a mask. For example, Ar is used as the etching gas, but it is not particularly limited. Etching apparatus is also not particularly limited, but can be, for example, an RIE apparatus.

Figure 2E:
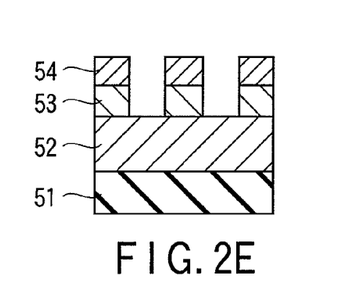

As shown in FIG. 2E, the first hard mask 53 is etched using the patterned second hard mask 54 as a mask to transfer the patterns and expose the surface of the magnetic recording layer 52 in the recesses. The etching is performed by employing, for example, an induction coupling plasma (ICP) RIE apparatus and using oxygen as the etching gas. During the etching, all or a part of the resist remaining on the second hard mask is stripped off, thereby forming the pattern of protrusions and recesses consisting mainly of the first hard mask 53 and the second hard mask 54.

Figure 2F:
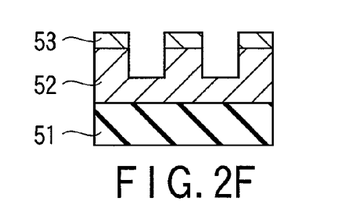

As shown in FIG. 2F, the remaining second hard mask 54 is removed by ion beam etching, and simultaneously, the magnetic recording layer 53 is subjected to magnetism deactivation, i.e., magnetically deactivated to form non-magnetic layer 56. Upon removing the second hard mask 53, a part of the magnetic recording layer in the recess may be etched. However, since the magnetic recording layer 52 has been magnetically deactivated to be non-magnetic, it is possible to attain good fringe characteristics when the processed medium is incorporated into the hard disc drive. Note that an ion gun of an electronic cyclotron resonance (ECR) type, for example, can be employed as the ion beam apparatus in this step.

Figure 2G:
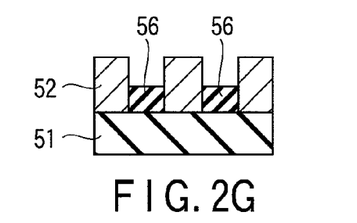

As shown in FIG. 2G, the remaining first hard mask 53 is removed. In this step, the first hard mask is removed with an induction coupled plasma RIE apparatus using oxygen as the etching gas.

Figure 2H:
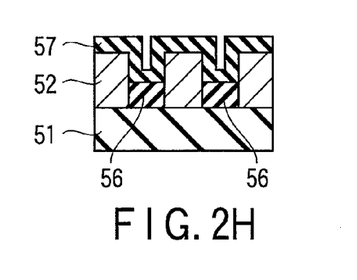

As shown in FIG. 2H, a protective film 54 with a thickness of 3 nm is deposited by CVD (chemical vapor deposition).

It should be noted that in the above steps, the thickness of each film and the depth of the recesses in each film may be easily measured by using, for example, AFM (atomic force microscope) and sectional TEM (transmission electron microscopy). In addition, metal mask species and the composition thereof can be easily determined by conducting EDX (energy dispersive X-ray spectroscopy) analysis. After the completion of the processing, it is possible to investigate the etching gas species used in the ion beam etching and the effect thereof by analyzing the remaining gas in the resultant medium by XPS (X-ray photoelectron spectroscopy). Also, the method shown in FIGS. 2A to 2H may not be limited to the manufacturing of a DTR medium, but may also be applied to the manufacturing of a bit patterned medium (BPM).

Here, the step of FIG. 2F will be described in more detail. In the method of the present invention, the second hard mask 54 is removed by ion beam etching in the step of FIG. 2F and, at the same time, the magnetic recording layer 52 exposed in the recesses is magnetically deactivated to form a nonmagnetic layer 56. During the etching step, a part of the magnetic recording layer 52 in the recesses can be etched. The etching depth thereof is appropriately controlled depending on flying characteristics of a read/write head of a hard disk drive when the resultant processed medium is incorporated into the drive. Specifically, the etching depth is controlled so that the protrusions and recesses of the magnetic recording layer 2 are in a level attaining stable flying characteristics of the head.

More specifically, the depth of the recesses is preferably 15 nm or less. If the depth is 15 nm or less, it is possible to omit a step of depositing nonmagnetic material into the recesses, and further, to enable the head to stably fly. When the etching depth is 15 nm or less, a part of the magnetic recording layer remains unetched. The remaining magnetic recording layer 52 in the recesses, however, has been made nonmagnetic because of magnetism deactivation. As a result, good fringe characteristics can be achieved when the processed medium is incorporated into a hard disc drive.

Jpn. Pat. Appln. KOKAI Publication Nos. 2005-50468 and 2005-56535 disclose the technique in which etching of the magnetic recording layer and the removing of a hard mask are performed in a same step by using an Ar ion beam etching. However, in the ion beam etching with Ar gas, the magnetic recording layer in the recesses cannot be magnetically deactivated in a sufficient manner. As a result, it is required to etch the magnetic recording layer throughout the thickness thereof in order to attain good fringe characteristics. In this case, however, considering flying characteristics of the magnetic head when the magnetic recording media is incorporated in a hard disc drive, a step of filling in the recess with non-magnetic material is required to attain planarization, resulting in severe decrease of productivity.

The material and the thickness of the second hard mask 54 are suitably selected, considering adherence to the resist 55 as well as etching selectivity ratio with respect to the magnetic recording layer 52. In particular, with respect to the etching selectivity ratio, it is preferable to consider the followings. For example, in case of magnetically deactivating the magnetic recording layer 52 by using He—$N_2$ mixture gas for the ion-beam etching, the second hard mask 54 is nitrided. In general, because nitride has low etching rate, stripping of the second hard mask becomes to be difficult. Therefore, the second hard mask 54 is preferably made of a material which has an appropriate etching rate even when it is nitrided.

In view of the above, the second hard mask 54 is preferably selected from the group consisting of Al, Ti, Ru, Pt, Co, Au, Ag, W, Mo, Si, Nb, Cu, Mn, Zr, Pd, and nitrides, oxides, and mixtures thereof. Among these, particularly preferred are Cu, Al, Si, SiC, NiNbZrTi, CoPt, and CoCrPt—$SiO_2$.

If the thickness th of the second hard mask 54, etching depth dm of the magnetic recording layer 52, etching rate rh of the second hard mask, and etching rate rm of the magnetic recording layer satisfy the relationship of th/rh<dm/rm, it is desirable that the thickness of the second hard mask 54 is thin as possible, in particular, 2 nm or more and 15 nm or less is preferred. When the thickness of the second hard mask is less than 2 nm, a planar film structure thereof cannot be achieved, resulting that the adherence thereof to the resist becomes lower and the film becomes easier to be stripped off. When the thickness of the second hard mask is larger than 15 nm, the recesses of the magnetic recording layer are required to be made deep in order to magnetically deactivate the magnetic recording layer. This is not preferred because the flying of the head, in this case, is not stabilized when the processed medium incorporated into the hard disc drive.

It is preferable that the gas used in the ion-beam etching is selected from the group consisting of He, Ne, Kr, Xe, $N_2$, $CF_4$, $O_2$, Cl, $H_2$, and mixture thereof. By using these gases as etchant, the magnetic recording layer in the recesses can be magnetically deactivated in a satisfactory manner. In particular, He, $N_2$, He—$N_2$ mixture gas, and $CF_4$ are preferable as etchant gas because these gases have large effect for magnetism deactivation of the recording layer.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

<Protective Film>

The protective film is provided for the purpose of preventing corrosion of the perpendicular magnetic recording layer and also preventing the surface of a medium from being damaged when the magnetic head is brought into contact with the medium. Examples of the material of the protective film include those containing C, $SiO_2$ or $ZrO_2$. It is preferable to set the thickness of the protective film from 1 to 10 nm. Since such a thin protective film enables to reduce the spacing between the head and medium, it is suitable for high-density recording. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective film for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

<Imprinting>

A stamper having patterns of recording tracks and servo data is pressed against a substrate on which a resist is applied and then the resist is cured, thereby to transfer the patterns of protrusions and recesses.

As the resist, for example, a UV curing resist or a general novolak-type photoresist may be used. When the UV curing resist is used, the stamper is preferably made of a transparent material such as quartz or resin. The UV curing resist is cured by applying ultraviolet ray. A high-pressure mercury lamp, for example, can be used as a light source of the ultraviolet ray. When the general novolak-type photoresist is used, the stamper may be made of a material such as Ni, quartz, Si and SiC.

The resist can be cured by applying heat or pressure.

<Removal of Resist Residues>

Resist residues remaining after imprinting are removed by $O_2$ gas RIE (reactive ion etching). As the plasma source, ICP (inductively coupled plasma) apparatus capable of producing high-density plasma under a low pressure is preferable, but an ECR (electron cyclotron resonance) plasma or general parallel-plate RIE apparatus may be used.

<Deposition of Protective Film and Aftertreatment>

The carbon protective film is preferably deposited by CVD to improve coverage to the protrusions and recesses, but it may be deposited by sputtering or vacuum evaporation. The CVD produces a DLC film containing a large amount of $sp^3$-bonded carbon. A lubricant is applied to the surface of the protective film. As the lubricant, for example, perfluoropolyether, fluorinated alcohol, fluorinated carboxylic acid or the like is used.

Figure 3:
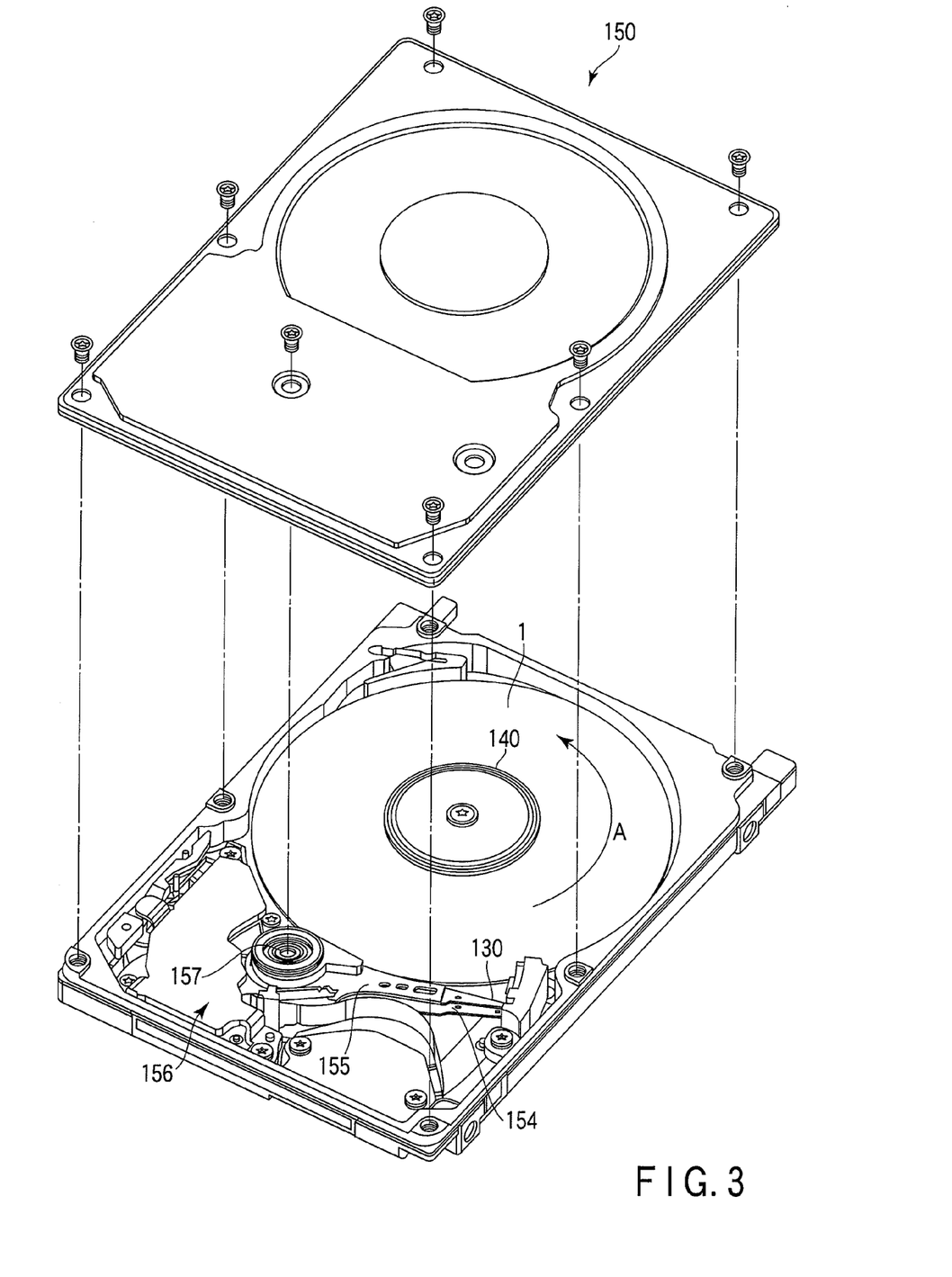
FIG. 3 is a perspective view of a magnetic recording apparatus comprising a magnetic recording media which is manufactured according to the present invention.

Now, the magnetic recording apparatus (HDD) will be described below. FIG. 3 is a perspective view of a magnetic recording apparatus in which the magnetic recording medium manufactured according to the present invention is installed.

As shown in FIG. 3, the magnetic recording apparatus 150 according to the embodiment is of a type using a rotary actuator. The patterned medium 1 is attached to the spindle 140, and is rotated in the direction of arrow A by a motor (not shown) that responds to control signals from a drive controller (not shown). The magnetic recording apparatus 150 may comprise a plurality of patterned media 1.

The head slider 130 configured to read from and write to the patterned medium 1 is attached to the tip of the film-like suspension 154. The head slider 130 has a magnetic head mounted near the tip thereof. When the patterned medium 1 rotates, the air bearing surface (ABS) of the head slider 130 is held at a predetermined height so as to fly over the surface of the magnetic disk 200 under a balance of pressing force of the suspension 154 and the pressure produce on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic head can be accessed any position on the patterned medium 1.

EXAMPLES

Example 1

Using a stamper having patterns of protrusions and recesses corresponding to a DTR medium shown in FIG. 1, a DTR medium was manufactured by the method shown in FIGS. 2A to 2H. The conditions in each step are as follows.

The step of removing resist residues shown in FIG. 2C was carried out with an ICP-RIE apparatus using $O_2$ under the following conditions: gas pressure of 0.1 Pa, antenna power of 100 W, bias power of 20 W and etching time of 9 seconds.

The step of etching the second hard mask 54 to expose the surface of the first hard mask 52 shown in FIG. 2D was carried out with an ion-beam etching apparatus using Ar under the following conditions: gas pressure of 0.04 Pa, plasma power of 500 W, acceleration voltage of 600 V and etching time of 10 seconds.

The step of etching the first hard mask 53 to expose the surface of the magnetic recording layer 52 shown in FIG. 2E was carried out with an ICP-RIE apparatus using $O_2$ under the following conditions: gas pressure of 0.1 Pa, antenna power of 100 W, bias power of 20 W and etching time of 20 seconds.

The step of removing the second hard mask 54 and deactivating the magnetism of the magnetic recording layer 52 in the recesses shown in FIG. 2F was carried by ion-beam etching using a mixed gas of He—$N_2$ under the following conditions: gas pressure of 0.04 Pa, plasma power of 100 W, acceleration voltage of 1000 V and etching time of 20 seconds.

The step of etching the first hard mask 61 shown in FIG. 2G was carried out with an ICP-RIE apparatus using $O_2$ under the following conditions: gas pressure of 1.5 Pa, antenna power of 400 W, bias power of 0 W and etching time of 20 seconds.

The depth of the recesses of the magnetic recording layer 52 after processing was examined by TEM observation, and found to be 13 nm.

A lubricant was applied to the manufactured DTR medium, which was then installed in a drive to evaluate the bit error rate before neighbor-recording and a good value as low as $10^{-6}$ was obtained. A fringe resistance was evaluated after 10000 times recording on a neighboring track. A value as low as $10^{-4.8}$ was obtained, and adaptability to DTR medium can be confirmed.

Comparative Example 1

When the second hard mask 52 was removed by ion-beam etching in the step corresponding to FIG. 2F, Ar was used as the etchant gas. The etching was carried out under the following conditions: gas pressure of 0.04 Pa, plasma power of 500 W, acceleration voltage of 600 V and etching time of 20 seconds. The depth of the recesses of the magnetic recording layer 52 after processing was examined by TEM observation, and found to be 13 nm. A DTR medium was manufactured in the same procedures as in Example 1 except for the above.

The depth of the recesses in the magnetic recording layer of the medium obtained in Comparative Example 1 was 13 nm that was equal to that obtained in Example 1. However, in the case of the medium of Comparative Example 1, the step of deactivation of magnetism in the recesses of the recording layer was not carried out unlike the case of the medium of Example 1.

A lubricant was applied to the manufactured DTR medium, which was then installed in a drive to evaluate the bit error rate and a good value as low as $10^{-6}$ was obtained. Evaluation of fringe resistance was also performed after recording on neighboring tracks 10000 times, however, error rate was $10^{-3.6}$. Therefore, it was found that the DTR medium was unsuitable to a magnetic recording medium because of insufficient fringe resistance. It is supposed that the result is due to insufficient deactivation of magnetism of the magnetic recording layer in the recesses.

It is found from comparison with the method of Comparative Example 1 that, in the method of manufacturing the patterned medium according to the present invention, the patterned medium with excellent fringe resistance upon incorporation into the hard disk drive can be manufactured because the magnetic recording layer in the recesses is magnetically deactivated at the same time with removing the second hard mask.

Example 2

By using Cu, Co, CoPt, Al, Si, Ti, SiC, NiNbZrTi, CoCrPt—$SiO_2$, Au, Ag, Ru, Pt as the second hard mask, 13 types of DTR media were manufactured. These DTR media were produced employing similar procedure as the Example 1 with setting the thickness of the second hard mask to 2 nm. Etching time was appropriately adjusted depending on the material of each second hard mask. The depth of the recesses of the magnetic recording layer was determined by TEM observation. As a result, it was found that all media have the recesses of 13 nm depth.

A lubricant was applied to the manufactured DTR media, which were then installed in a hard disk drive to evaluate the error rate and found that all media had good values as low as $10^{-6}$ before neighbor-recording. A fringe resistance was evaluated after 10000 times recording on a neighboring track. A value as low as $10^{-4.8}$ to $10^{-5.0}$ was obtained, and adaptability to DTR medium can be confirmed.

For comparison, Fe was used as the second hard mask. In this case, when removing the stamper after imprinting in FIG. 2B, the resist was partly stripped off because the adherence between the resist and the medium is poor. As a result, the mask cannot be made and the DTR medium cannot be manufactured.

These results are shown in Table 1. From the Table 1, it can be seen that patterned medium can be manufactured, which medium has good flying characteristics upon being installed in a hard disk drive and is excellent in fringe resistance.

TABLE 1

| Second hard mask and DTR medium adaptability | |
|---|---|
| Second hard mask | DTR medium adaptability |
| Cu | good |
| Co | good |
| CoPt | good |
| Al | good |
| Si | good |
| Ti | good |
| SiC | good |
| NiNbZrTi | good |
| CoCrPt—$SiO_2$ | good |
| Au | good |
| Ag | good |
| Ru | good |
| Pt | good |
| Fe | unsatisfactory |

Example 3

By using He, $N_2$, He—$N_2$ gas mixture, $CF_4$ as the etchant gas, four types of DTR media were manufactured. Note that the etching time was adjusted such that 13 nm of etching depth is achieved at the etching rate of the respective etchant gas when cross-sectional TEM observation is performed. Except the above, DTR media were manufactured as the similar process as Example 1.

A lubricant was applied to the manufactured DTR media, which were then installed in a hard disk drive to be evaluated and found that all media had good values as low as $10^{-6}$ before neighbor-recording. A fringe resistance was evaluated after 10000 times recording on a neighboring track. A value as low as $10^{-4.8}$ to $10^{-5.1}$ was obtained, and adaptability to DTR medium can be confirmed.

On the other hand, when Ar etchant gas was used as in the Comparative Example 1, fringe resistance was unsatisfactory as described above.

These results are shown in Table 2. From the Table 2, it can be seen that patterned medium which is excellent in fringe resistance can be manufactured by using the above-described etchant gas other than Ar in the ion-beam etching since the magnetism of the magnetic recording layer in the recesses can be deactivated during the second hard mask is removed.

TABLE 2

| Ion-beam etching gas and fringe resistance | |
|---|---|
| Etchant Gas | Fringe resistance |
| He | good |
| $N_2$ | good |
| He—$N_2$ | good |
| $CF_4$ | good |
| Ar | unsatisfactory |

Example 4

Three types of DTR media having different depth of the magnetic recording layer were manufactured by setting the etching time of the ion-beam etching shown in FIG. 2F to 20 sec, 23 sec, or 31 sec. respectively. Except the above, DTR media were manufactured as the similar process as Example 1. The depth of the recesses of the magnetic recording layer after processing described above were determined by TEM observation, and the depth was found to be 13 nm, 15 nm or 20 nm.

A lubricant was applied to the manufactured DTR media having 13 nm or 15 nm of the recess depth of the magnetic recording layer, which were then installed in a hard disk drive to evaluate the error rate and found that both media had good values as low as $10^{-6}$ before neighbor-recording. A fringe resistance was evaluated after 10000 times recording on a neighboring track to give a value as low as $10^{-4.8}$ and $10^{-5.1}$, confirming adaptability to DTR medium.

A lubricant was applied to the DTR medium having 20 nm of drecess depth in the magnetic recording layer, which was then installed in a hard disk drive to evaluate the medium. As a result, head flying was not stabilized to destroy the head and the performance was not able to be evaluated. It is assumed that this is due to excessive amount of etching depth of the magnetic recording layer.

As described above, it can be seen that if the etching depth of the magnetic recording layer is 15 nm or less, a patterned medium having flying stability of the head and excellent fringe resistance when installed in a hard disk drive can be manufactured.

Example 5

DTR media were tried to be made by setting the thickness of the second hard mask to 1 nm, 2 nm, 5 nm, or 20 nm.

When the thickness of the hard mask was set to 1 nm, resist film were partly stripped off upon removing the stamper after imprinting in FIG. 2B because the adherence between the resist and the medium is poor. As a result, the mask cannot be formed and the DTR medium cannot be manufactured. It is assumed that this is caused by the dispersion of thickness of the second hard mask which is due to excessively thin thickness thereof.

In case that the thickness of the second hard mask was set to be other than 1 nm, the etching time was appropriately adjusted according to the thickness of the second hard mask. In all cases, the ion-beam etching step in FIG. 2F was carried out under the condition of etching time of 23 sec.

For the DTR media manufactured by setting the thickness of the second hard mask to be 2 nm, 5 nm, 15 nm, the etching depth of the magnetic recording layer was determined by TEM observation. As a result, it was found that all the media had 15 nm of etching depth.

A lubricant was applied to the manufactured DTR media, which were then installed in a hard disk drive to be evaluated and found that all media had good values as low as $10^{-6}$ before neighbor-recording. A fringe resistance was evaluated after 10000 times recording on a neighboring track to attain error rate of $10^{-4.9}$.

Incidentally, it was confirmed that the etching rate (rh) of Cu was 0.75 nm/sec, the etching depth (dm) and the etching rate (rm) of the magnetic recording layer was 15 nm and 0.65 nm/sec, respectively, and all of the media manufactured by setting the thickness of the second hard mask to be 2 nm, 5 nm, and 15 nm satisfied the relationship of the/rh<dm/rm.

The DTR medium manufactured by setting the thickness of the second hard mask to be 20 nm was examined by TEM observation. As a result, it was found that the etching depth of the magnetic recording layer was 15 nm, while the depth of the recess after processing was 33 nm, and that about 3 nm of Cu and 15 nm of carbon hard mask were remained on the magnetic recording layer.

A lubricant was applied to the DTR media manufactured by setting the depth of the recess in the magnetic recording layer to be 20 nm, which were then installed in a hard disk drive to evaluate the medium. As a result, head flying was not stabilized so as to destroy the head and the performance was not able to be evaluated. It is assumed that this is due to excessive amount of etching depth of the magnetic recording layer. Incidentally, it was confirmed that thickness of the Cu film (th) was 20 nm, while the etching rate (rh) of Cu was 0.75 nm/sec, the etching depth (dm) and the etching rate (rm) of the magnetic recording layer was 15 nm and 0.65 nm/sec, respectively, and these values had the relationship of the/rh>dm/rm.

From the results described above, it can be found that by setting the thickness of the second hard mask to be from 2 nm to 15 nm, good head flying stability and excellent fringe resistance can be attained when the medium after processing are installed into the hard disk drive.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufactoring a magnetic recording medium comprising:
   forming a first hard mask, a second hard mask selected from the group consisting a Aluminum (Al), Titanium (Ti), Ruthenium (Ru), Platinum (Pt), Cobalt (Co), Gold (Au), Silver (Ag), Silicon (Si), Copper (Cu), and oxides, alloys and mixtures thereof, and silicon Carbide (SiC), NiNbZrTi, CoPt, and CoCrPtSiO$_2$, and having thickness of 2 nm or more and 15 nm or less, and resist film on a magnetic recording layer;
   imprinting a stamper on the resist film in order to transfer patterns of recesses and protrusions;
   removing residues remained in recesses of the patterned resist film;
   etching the second hard mask using the patterned resist film as a mask in order to transfer patterns of recesses and protrusions;
   etching the first hard mask using the patterned second hard mask as a mask to transfer patterns of recesses and protrusions; and
   deactivating magnetism of the magnetic recording layer exposed in the recesses and removing the second hard mask by ion-beam etching using an etching gas selected from the group consisting of Helium (He), Nitrogen (N$_2$), Tetrafluoromethane (CF$_4$), and a mixture gas of He and N$_2$, wherein the magnetic recording layer is etched to a depth of 15 nm or less, and a thickness of the second hard mask (th), etching depth of the magnetic recording layer (dm), etching rate of the second hard mask (rh), and etching rate of the magnetic recording layer (rm) satisfy the following formula:

$$th/rh \leq dm/rm.$$

2. The method of claim 1, wherein the second hard mask is selected from the group consisting of Copper (Cu), Aluminum (Al), Silicon (Si), Silicon Carbide (SiC), Ni—Nb—ZrTi alloy, Co—Pt alloy, and CoCrPt—SiO$_2$ alloy.

3. The method of claim 1, wherein the ion-beam etching is performed by using etching gas selected from the group consisting of Helium (He), Neon (Ne), Krypton (Kr), Xenon (Xe), Nitrogen (N$_2$), Tetrafluoromethane (CF$_4$), Oxygen (O$_2$), Chloride (Cl), Hydrogen (H$_2$), and mixture gas thereof.

4. The method of claim 1, wherein the ion-beam etching is performed by using etching gas comprising a mixture gas of He and N$_2$.

5. The method of claim 1, wherein the method is applied to a discrete track recording medium.

6. The method of claim 1, wherein the method is applied to a bit patterned medium.

7. The method of claim 1, wherein the magnetic recording layer comprises magnetic crystal grains that are dispersed in the layer.

8. The method of claim 1, wherein the depth of the recesses is less than about 15 nm.

9. The method of claim 1, wherein removal of the second hard mask and the magnetism deactivation of the magnetic recording layer are performed simultaneously.

10. The method of claim 1, wherein the stamper is made by a process selected from the group consisting of EB lithography, Ni electroforming, and injection molding.

11. The method of claim 1, wherein the magnetic recording layer is deposited on a glass substrate.

12. The method of claim 1, wherein the magnetic recording layer is about 20 nm thick.

13. The method of claim 1, wherein the first hard mask comprises carbon and is about 15 nm thick.

14. The method of claim 1, wherein the second hard mask comprises Cu and is about 3 nm thick.

15. The method of claim 1, wherein the resist is deposited on the second hard mask by spin coating.

16. The method of claim 1, wherein the resist residues are removed by a dry etching.

17. The method of claim 1, further comprising etching a part of the magnetic layer exposed in the recesses.

18. The method of claim 1, wherein the magnetic recording layer comprises Cobalt (Co) and Platinum (Pt).

19. The method of claim 18, wherein the magnetic recording layer comprises a majority of Cobalt (Co).

20. The method of claim 1, wherein the patterns of the resist are transferred to the second hard mask by ion-beam etching using the patterned resist as a mask.

21. The method of claim 20, wherein Argon (Ar) is used as the etching gas.

* * * * *